United States Patent [19]

Niwa et al.

[11] Patent Number: 5,031,077
[45] Date of Patent: Jul. 9, 1991

[54] SOLID ELECTROLYTE CAPACITOR AND MANUFACTURING METHOD THEREFOR

[75] Inventors: Shinichi Niwa, Osaka; Kenji Kakuma, Kyoto; Katsunori Mizutomi, Osaka, all of Japan

[73] Assignee: Sanyo Electric Co., Ltd., Moriguchi, Japan

[21] Appl. No.: 472,983

[22] Filed: Jan. 12, 1990

[30] Foreign Application Priority Data

| Jan. 20, 1989 [JP] | Japan | 1-12715 |
| Apr. 20, 1989 [JP] | Japan | 1-100796 |
| Oct. 18, 1989 [JP] | Japan | 1-270614 |

[51] Int. Cl.$^5$ .............................................. H01G 9/02
[52] U.S. Cl. .................................. 361/527; 29/25.03
[58] Field of Search ...................... 361/525, 526, 527; 252/62.2; 29/25.03

[56] References Cited

U.S. PATENT DOCUMENTS

| 3,872,358 | 3/1975 | Murakami et al. | 361/526 |
| 4,580,855 | 4/1986 | Niwa | 361/527 |
| 4,664,830 | 5/1987 | Shinozaki et al. | 252/62.2 |
| 4,679,124 | 7/1987 | Yoshimura et al. | 361/527 |
| 4,828,738 | 5/1989 | Tsuchiya et al. | 252/62.2 |

*Primary Examiner*—Donald A. Griffin
*Attorney, Agent, or Firm*—Armstrong, Nikaido, Marmelstein, Kubovcik & Murray

[57] ABSTRACT

In a solid electrolyte capacitor, an improvement wherein the solid electrolyte is a mixture of at least two kinds of 7,7,8,8-tetracyanoquinodimethane complexes having cations different from each other which is obtained by cooling the mixture in a liquid state, the mixture being so stable to a high heat applied to the capacitor upon mounting the same on a circuit board using reflow solder. Further, a method for aging solid electrolyte capacitors is also disclosed wherein a higher aging temperature is employed.

3 Claims, 1 Drawing Sheet

SOLID ELECTROLYTE CAPACITOR AND MANUFACTURING METHOD THEREFOR

BACKGROUND OF THE INVENTION

1. Field of the Invention

The present invention relates to a solid electrolyte capacitor and a manufacturing method therefor more particularly to an organic semiconductor solid electrolyte capacitor using 7,7,8,8,-tetracyanoquinodimethane (hereinafter referred to as "TCNQ") complexes as an electrolyte.

2. Related Art

One of inventors of the present invention has proposed various organic semiconductor solid electrolyte capacitors using a TCNQ complex as an electrolyte. For example, in the U.S. Pat. No. 4,580,855, there is disclosed a solid electrolyte capacitor wherein a TCNQ complex of N-substituted isoquinoline of which the substituent at N atom is an alkyl group is used as an electrolyte. The solid electrolyte capacitors of this type exhibit excellent high frequency characteristics and, therefore, are widely used for switching power sources or the like.

In recent years, according to the necessity of miniaturization of electronic apparatuses, capacitors of this type are also demanded to miniaturize as chips which are mountable directly on a printed circuit board using reflow solder.

In general, the TCNQ complex is too weak to resist the heat applied upon soldering capacitor of chip type and deterioration of performance of the capacitor such as an extraordinary increase of the leakage current or the like is experienced. Accordingly, in order to improve the heat resistivity of the TCNQ complex, some TCNQ complexes having melting points higher than those of the conventional TCNQ complexes have been developed.

However, TCNQ complexes having been developed until now exhibit improved heat resistivities but the electrical conductivities of them are considerably lowered in comparison of that of the conventional isoquinoline TCNQ complex when solidified by cooling after melted once. Due to this, they have disadvantages in that the excellent high frequency characteristic which is the most important property of the capacitor using a conventional TCNQ complex is lost.

SUMMARY OF THE INVENTION

Accordingly, one of the objects of the present invention is to provide organic semiconductor solid electrolyte capacitors which exhibit excellent high frequency characteristics even if high heat were applied to them upon soldering.

Another object of the present invention is to provide TCNQ complexes for solid electrolyte capacitors which are able to yield both the high heat resistivity against soldering and the excellent high frequency characteristics to the capacitors.

A further object of the present invention is to provide a method for manufacturing solid electrolyte capacitors using at least one TCNQ complex which is able to yield a high heat resistivity to them.

In order to achieve these objects, according to the first invention of the present application, there is provided a solid electrolyte capacitor including an electrolyte being comprised of a mixture of at least two kinds of TCNQ complexes having cations different from each other, said mixture of TCNQ complexes being melted by heating and impregnated into a capacitor element and, then, solidified by cooling.

When said mixture of TCNQ complexes having different cations is solidified by cooling after being liquefied by heating, the equivalent series resistance (hereinafter referred to as E.S.R.) thereof is reduced to about one tenth to one half of the E.S.R. of each of TCNQ complexes. In other words, the electrical conductivity of the mixture of TCNQ complexes is increased from two times to ten times when compared with that of each of TCNQ complexes. The melting point of the mixture of TCNQ complexes having been solidified after being melted by heating is supposed to be lowered when compared with that of each TCNQ complex, however it is still higher than that of the conventional isoquinoline TCNQ complex. Therefore, the mixture has a melting point and a heat resistivity enough for enduring the heat applied upon mounting chips of capacitors on circuit boards using reflow solder.

According to the second invention of the present application, there is provided a method for manufacturing solid electrolyte capacitors comprising the following steps;

a step for impregnating at least one TCNQ complex having been liquefied into a capacitor element which has an electrical conductivity available as an electrolyte, said electrical conductivity being defined as that of said TCNQ complex solidified after being liquefied once, a step for solidifying the TCNQ complex having been impregnated, a step for enclosing said capacitor element in a case made of a heat resistive material, and a step for aging said capacitor by heating it at a temperature falling in a range defined between 150° C. and the melting point of the TCNQ complex.

Conventionally, aging of capacitors was usually done at a temperature falling in a range between 105° C. and 125° C. since the melting point of the TCNQ complex used for the solid electrolyte capacitor ranges from about 210° C. to 260° C.

Contrary to this, according to the present invention, the aging of capacitors is done at a temperature higher than that of the conventional aging which falls in a range defined between about 150° C. and 260° C. and, therefore, the heat resistivity of an insulating cover membrane which is generated to repair a leakage current is supposed to be enhanced (See Tables 3 and 4 in the present specification). Thereby, it becomes possible to prevent the leakage current from increasing even in the case that the capacitors are exposed to such a high temperature as applied upon soldering.

Further, since the efficiency of aging to a flowing current (the rate of generation of the insulating membrane) in the case of an aluminium electrolyte capacitor impregnated with a TCNQ complex becomes better as an aging temperature becomes higher, it becomes possible to shorten the aging time considerably.

BRIEF DESCRIPTION OF THE DRAWINGS

These and other objects and features of the present invention will become clear from the following description taken in conjunction with the preferred embodiment thereof with reference to the accompanying drawings, in which.

DETAILED DESCRIPTION OF THE PREFERRED EMBODIMENT

Figure 1:
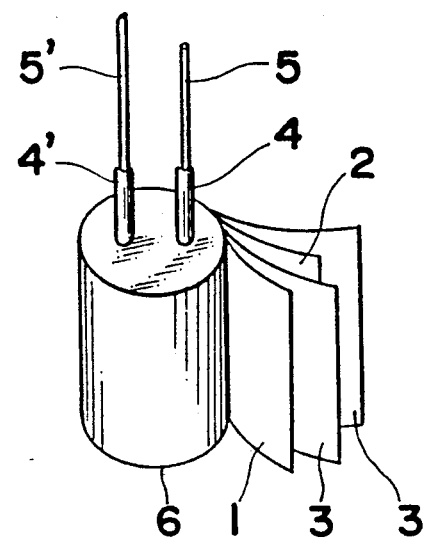
FIG. 1 is a perspective view of a capacitor element to which the present invention is applied.

FIG. 1 shows a capacitor element to which the present application is applied.

At first, aluminum foils having a purity higher than 99.99% are subjected to etching treatment in order to increase the effective surface area of them.

Next, they are subjected to a chemical generation processing for forming oxidized membranes (membranes of oxidized aluminum) on surfaces of the aluminum foils electro-chemically in an electrolyte liquid.

An anode foil 1 comprised of the aluminum foil processed as mentioned above and an opposing cathode foil 2 are rolled up into a cylinder putting a Manila paper as a separator inbetween these foils. Thus, a capacitor element 6 is formed, as shown in FIG. 1. Reference numerals 4 and 4' indicate aluminum leads and reference numerals 5 and 5' indicate lead wires.

Further, the capacitor element 6 is subjected to a heat treatment for carbonizing the Manila paper as the separator 3 to lower the density thereof by thinning fibers thereof.

Figure 2:
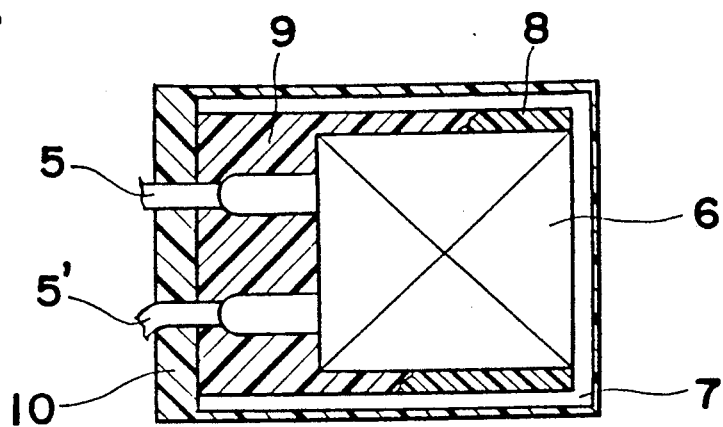
FIG. 2 is a sectional view of a solid electrolyte capacitor according to the present invention.
Figure 3:
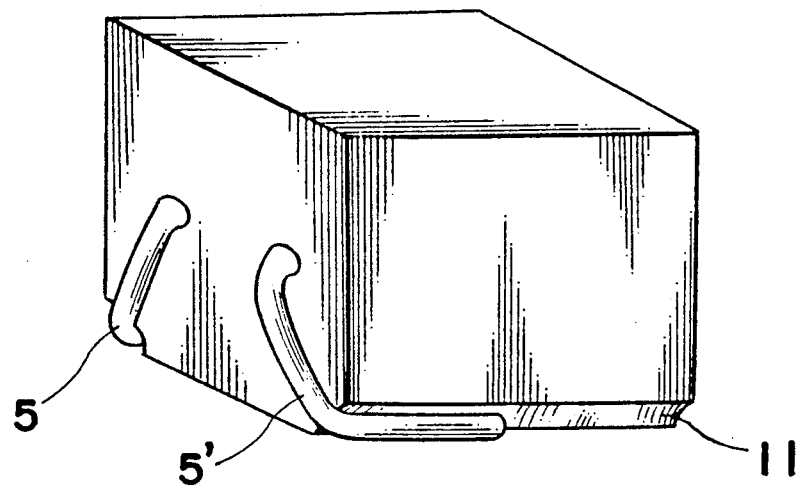
FIG. 3 is a perspective view of the solid electrolyte capacitor according to the present invention.

FIG. 2 is a sectional view of a capacitor of chip type wherein the capacitor element 6 shown in FIG. 1 is enclosed in an aluminum case 7 and FIG. 3 is an appearance of the capacitor of chip type.

Before inserting the capacitor element, predetermined quantities of TCNQ complexes 8 are charged into the aluminum case 7 and the latter is put on a heat plate (not shown). In the present preferred embodiment, the aluminum case 7 is heated up at a temperature equal to or higher than 210° C. to liquefy the TCNQ complexes charged thereinto.

Thereafter, the preheated capacitor element 6 is inserted in the aluminum case 7 to impregnate the liquefied TCNQ complexes into the capacitor element 6. And, immediately, the TCNQ complexes are solidified by cooling. Thereafter, a resin 9 being not reactive with the TCNQ complexes is charged into the aluminum case 7 and the opening of the case 7 is sealed with an epoxy resin 10. The aluminum case 7 has grooves 11 formed along bottom edges thereof into which lead wires 5, 5' are inserted.

Next, examples of TCNQ complexes having melting points higher than about 230° C. are shown in Table 1. In Table 1 there are also listed up electrical characteristics of capacitors made by using respective TCNQ complexes. Complex symbol (I) in Table 1 indicates a conventional TCNQ complex used in conventional solid electrolyte capacitors. Lutidine used for compositing TCNQ complexes indicated by complex symbols (A), (B) and (H) is 3.5-lutidine exactly and phenylpyridine used for compositing TCNQ complexes indicated by complex symbols (C), (D) and (E) is 4-phenylpyridine exactly. Further, specifications of the capacitor used were 25 volts in the voltage and 0.68 μF in the capacitance. Also, symbols used in Table 1 indicate values as follows;

Cap; Electrostatic Capacitance (nF) at 120 Hz
tan δ; Tangent of Loss angle (%) at 120 Hz
L.C.; Leakage current {(μA after 1 minute)}
E.S.R; Equivalent Series Resistance (mΩ) at 100 kHz
ΔCap; Rate of change in the Capacitance (%) at 120 Hz.

TABLE 1

| | Composition of TCNQ complex | M.P. °C. | Electrical Characteristics | | | |
|---|---|---|---|---|---|---|
| | | | Cap | tan δ | L.C. | E.S.R. |
| A | N,N-pentamethylene-(lutidinium)2(TCNQ)4 | 250 | 625 | 14.1 | 0.01 | 5200 |
| B | N,N-hexylmethylene (lutidinium)2(TCNQ)4 | 238 | 717 | 7.9 | 0.01 | 2300 |
| C | N-ethylphenyl-pyridinium(TCNQ)2 | 234 | 714 | 1.63 | 0.01 | 2290 |
| D | N-n-propylphenyl-pyridinium(TCNQ)2 | 246 | 672 | 1.45 | 0.03 | 1310 |
| E | N-isobutylphenyl-pyridinium(TCNQ)2 | 242 | 727 | 1.45 | 0.01 | 1630 |
| F | N-bengiliso-quinolinium(TCNQ)2 | 238 | 664 | 2.07 | 0.01 | 2140 |
| G | N-phenethyl-isoquinolinium(TCNQ)2 | 254 | 704 | 1.63 | 0.01 | 2480 |
| H | N-phenethyl-lutidinium(TCNQ)2 | 267 | 703 | 2.50 | 0.01 | 1500 |
| (I) | N-n-buthyl-isoquinolinium(TCNQ)2 | 215 | 716 | 1.09 | 0.01 | 190 |

Table 2 contains results obtained when capacitors were made using various mixtures of the same quantity of TCNQ complexes listed up in Table 1 and those obtained in a reflow test made under thermal conditions supposed to be caused upon mounting capacitors using reflow solder. In the reflow test, capacitors were leaved at 160° C. for two minutes and subsequently, were leaved at 230° C. for 30 seconds in a reflow furnace.

It is to be noted that no significant differences in the results were observed when used either one of the mixture mixed with respective TCNQ complexes synthesized and separated beforehand and that obtained by mixing materials in synthesizing process beforehand.

Further, only the mixtures of the same quantity of TCNQ complexes are mentioned in the present preferred embodiment, however, the rate of mixing of TCNQ complexes is not limited to the above since essential effects can be obtained when it is changed to a rate such as 2:1, 3:1 or the like.

TABLE 2

| TCNQ Symbol | Initial electrical characteristics | | | | Electrical characteristics after reflow test | | | |
|---|---|---|---|---|---|---|---|---|
| | Cap | tan δ | L.C. | E.S.R. | ΔCap | tan δ | L.C. | E.S.R. |
| A + C | 687 | 1.19 | 0.08 | 807 | −3.1 | 1.80 | 23 | 791 |
| A + D | 722 | 0.95 | 0.01 | 463 | −1.7 | 1.17 | 5.0 | 459 |
| A + F | 690 | 1.17 | 0.09 | 799 | −4.3 | 1.73 | 3.6 | 798 |
| A + G | 736 | 1.11 | 0.04 | 577 | −1.6 | 1.58 | 8.6 | 573 |
| A + H | 753 | 1.23 | 0.03 | 435 | −2.0 | 1.32 | 2.8 | 460 |
| B + D | 752 | 1.57 | 0.02 | 604 | −3.2 | 2.14 | 42 | 746 |
| C + G | 709 | 1.24 | 0.02 | 1190 | −2.3 | 1.95 | 16 | 1190 |
| D + G | 706 | 1.34 | 0.01 | 898 | −3.7 | 1.55 | 7.4 | 919 |

TABLE 2-continued

| TCNQ Symbol | Initial electrical characteristics | | | | Electrical characteristics after reflow test | | | |
|---|---|---|---|---|---|---|---|---|
| | Cap | tan δ | L.C. | E.S.R. | ΔCap | tan δ | L.C. | E.S.R. |
| E + F | 681 | 1.48 | 0.05 | 1067 | −4.5 | 1.68 | 19 | 1238 |
| A + D + G | 737 | 1.06 | 0.01 | 541 | −2.4 | 1.47 | 37 | 537 |
| (I) | 716 | 1.09 | 0.01 | 190 | −14.4 | 4.12 | 1890 | 201 |

As is apparent from Table 2, mixtures of at least two kinds of TCNQ complexes having cations different from each other as an electrolyte for solid electrolyte capacitors can control increase of E.S.R. and can yield capacitors having the heat resistivity endurable against the heat applied upon mounting them on printed circuit boards.

Though E.S.R. of a single TCNQ complex having a high melting point which is chosen in order only to improve the heat resistivity against the heat applied upon mounting capacitors becomes 7 to 27 times that of the conventional TCNQ, for instance, isoquinoline TCNQ (I) wherein the substituent at N atom is an alkyl group, E.S.R. of the mixed TCNQ complex according to the present invention can be reduced to an order of 2.4 to 6 times that of the conventional one and, further, electrical characteristics of the capacitor after exposed to severe thermal conditions, according to the present invention, are kept substantially unchanged from the initial electrical characteristics.

Next, the method for aging solid electrolyte capacitors is explained using examples.

EXAMPLE 1

The capacitor element 6 as shown in FIG. 1 was impregnated with N-n-buthylisoquinoline (TCNQ)$_2$ and, then, it was sealed with the resins 9 and 10 in the aluminum case 7 as shown in FIG. 2.

Specifications of the capacitor in this embodiment were 25 volts in the voltage and 15 μF in the capacitance.

The capacitors were aged under various conditions (A) to (E) cited below in a state that they were inserted in holes formed on the heat plate each of which has diameter slightly larger than that of the capacitor and a depth larger than the height of the capacitor.

Results of this aging test are listed up in Table 3. Ten samples were used per each aging condition and, therefore, each of values listed in Table 3 was a value obtained by averaging over ten samples. The melting point of N-n-buthylisoquinoline (TCNQ)$_2$ used in the preferred embodiment ranged from 210° C. to 220° C. Further, the aging voltage to be applied to the capacitor during aging was so called reduction voltage which was decreased as the heating temperature was increased.

Aging conditions:

A: Heating at 210° C. for 30 seconds and applying 20 volts as aging voltage (during cooling process also)
B: Heating at 180° C. for 40 seconds and applying 20 volts as aging voltage (during cooling process also)
C: Heating at 150° C. for 60 seconds and applying 21 volts as aging voltage (during cooling process also)
D: Heating at 125° C. for 180 seconds and applying 22 volts as aging voltage (during cooling process also) and,
E: Heating at 125° C. for one hour in a temperature regulating box and applying 22 volts as aging voltage (during cooling process also).

TABLE 3

| Aging condition | after Aging | | | | after Leaving at High temp. with no load | | | |
|---|---|---|---|---|---|---|---|---|
| | Cap μF | tan δ % | L.C. μA/30" | E.S.R. mΩ | Cap μF | tan δ % | L.C. μA/30" | E.S.R. mΩ |
| A | 15.9 | 1.6 | 0.59 | 40 | 15.6 | 1.9 | 8.9 | 39 |
| B | 16.2 | 1.5 | 0.73 | 41 | 16.0 | 1.8 | 23 | 40 |
| C | 16.1 | 1.5 | 0.82 | 39 | 15.8 | 1.8 | 56 | 38 |
| D | 15.8 | 1.4 | 5.04 | 42 | 15.7 | 1.8 | 154 | 41 |
| E | 15.9 | 1.5 | 1.08 | 41 | 15.8 | 1.7 | 68 | 39 |

In Table 3, symbols indicate as follows;
Cap; Electrostatic capacitance (μF) at 120 Hz
tan δ; Tangent of Loss angle (%) at 120 Hz
LC; Leakage Current (μA) after 30 seconds
E.S.R.; Equivalent Series Resistance (mΩ) at 100 kHz
No load; Applying no voltage to the capacitor In Table 3, there are also cited results of the test wherein capacitors were leaved for 3 minutes at 160° C. in stead of those of the heat resistance test for testing the heat resistivity upon soldering capacitors on a printed circuit board.

It is to be noted that similar results were obtained when used N-n-propylquinoline in place of N-n-Buthylisoquinoline.

EXAMPLE 2

Capacitors were prepared using capacitor elements 6 as shown in FIG. 1 and a mixture of TCNQ complexes of the same quantity comprised of N, N-Penthamethylene (lutidinium)$_2$ (TCNQ)$_4$ and N-n-propylphenylpyridinium (TCNQ)$_2$.

Each capacitor 6 was enclosed by curing with a buthyl rubber molded and sealded therewith, as shown in FIG. 2. Specifications of this capacitor were of 25 volts in the voltage and 1 μF in the capacitance.

These capacitors were subjected to aging under conditions (F) and (G). Table 4 shows results obtained by this aging test.

In this aging test, so called reduction voltage as mentioned above was employed as the aging voltage. The melting point of the mixture of TCNQ complexes was about 240° C.

Aging conditions;
F: Heating for 15 seconds by immersing capacitors by 80% of the height in a solder of 235° C. and applying 20 volts (during cooling process also) and G: Heating at 125° C. for one hour in a heat regulating box and applying 22 volts.

In Table 4, there are cited results of a solder immersing test wherein 80% of the capacitor was immersed in a solder of 235° C. for ten minutes instead of those of the heat resistivity test for mounting capacitors using reflow solder.

TABLE 4

| Aging condition | after Aging | | | | after Immersing Test in Solder by 80% | | | |
|---|---|---|---|---|---|---|---|---|
| | Cap µF | tan δ % | L.C. µA/15" | E.S.R. mΩ | Cap µF | tan δ % | L.C. µA/15" | E.S.R. mΩ |
| F | 1.08 | 2.1 | 0.04 | 510 | 1.04 | 2.8 | 0.82 | 540 |
| G | 1.12 | 1.8 | 0.06 | 580 | 1.07 | 3.0 | 430 | 520 |

As is apparent from the above mentioned, according to the present invention, the aging time needed in the manufacturing process of capacitors can be shortened extremely and reduction of processing steps and symplification of the aging equipment can be achieved.

Further, capacitors having heat resistivities being excellent in the electrical characteristics especially in the leakage current property can be obtained.

Capacitor elements of roll type are mentioned in the present preferred embodiment, however, the present invention is applicable to capacitors using anode elements made by sintering molded bodies of powder metal such as aluminum, tantalum and/or niobium and at least one TCNQ complex as an electrolyte.

It is understood that various other modifications will be apparent to and can be readily made by those skilled in the art without departing from the scope and spirit of the present invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which the present invention pertains.

What is claimed is:

1. Solid electrolyte capacitor comprising: a capacitor element having oxidized anode and cathode elements; and an electrolyte, wherein said electrolyte is comprised of a mixture of at least two kinds of TCNQ salts having cations different from each other, each of said TCNQ complex salts having a melting point higher than 230° C., said mixture of TCNQ complex salts being liquified by heating and impregnated into said capacitor element and, then, solidified by cooling, said liquified and then solidified mixture having a conductivity higher than that of each of said TCNQ complexes salts.

2. Solid electrolyte capacitor as claimed in claim 1, wherein at least two kinds of TCNQ complex salts are selected among the following TCNQ complex salts:
   (a) TCNQ complex salt with two molecules of lutidine combined at N atom thereof with a pentamethylene group or a hexylmethylene group,
   (b) TCNQ complex salt with isoquinoline or lutidine combined at N atom thereof, with a benzyl group or a phenethyl group, and
   (c) TCNQ complex salt with phenylphylidine combined at N atom thereof with a hydrocarbon having a carbon number from 2 to 4.

3. A method for manufacturing solid electrolyte capacitors comprising the steps of:
   impregnating at least one kind of TCNQ complex salt having been liquified into a capacitor element which has an electrical conductivity available as an electrolyte, said electrical conductivity being defined as that of said TCNQ complex salt solidified after being liquified at least once;
   solidifying said TCNQ complex salt having been impregnated;
   enclosing said capacitor element in a case made of a heat resistive material; and
   aging said capacitor by heating thereof at a temperature between 150° C. and the melting point of the TCNQ complex salt.

* * * * *

UNITED STATES PATENT AND TRADEMARK OFFICE
CERTIFICATE OF CORRECTION

PATENT NO. : 5,031,077
DATED : July 9, 1991
INVENTOR(S) : Shinichi NIWA et al

It is certified that error appears in the above-identified patent and that said Letters Patent is hereby corrected as shown below:

On the cover page, Item [30], second line, "1-100796" should read -- 1-100769 --.

Signed and Sealed this

Twenty-ninth Day of December, 1992

Attest:

DOUGLAS B. COMER

*Attesting Officer*     Acting Commissioner of Patents and Trademarks